United States Patent [19]

Yashiro

[11] Patent Number: 5,287,833
[45] Date of Patent: Feb. 22, 1994

[54] LUBRICATING OIL SUPPLYING SYSTEM FOR TWO CYCLE ENGINE

[75] Inventor: Yoshinobu Yashiro, Iwata, Japan

[73] Assignee: Yamaha Hatsudoki Kabushiki Kaisha, Iwata, Japan

[21] Appl. No.: 862,984

[22] Filed: Apr. 7, 1992

[30] Foreign Application Priority Data

Apr. 12, 1991 [JP] Japan .................. 3-108651

[51] Int. Cl.$^5$ ............................................. F01M 1/02
[52] U.S. Cl. ............................ 123/196 CP; 184/7.4
[58] Field of Search ....... 123/196 R, 196 CP, 196 W, 123/73 AD, 506, 503, 510; 184/7.4, 6

[56] References Cited

U.S. PATENT DOCUMENTS

| | | | |
|---|---|---|---|
| 3,779,225 | 12/1973 | Watson et al. | 123/506 |
| 4,385,614 | 5/1983 | Eheim et al. | 123/506 |
| 4,396,151 | 8/1983 | Kato et al. | 123/510 |
| 4,446,833 | 5/1984 | Matsushita et al. | 123/435 |
| 4,655,183 | 4/1987 | Taira et al. | 123/503 |
| 4,726,330 | 2/1988 | Shiga | 123/73 AD |
| 4,758,130 | 7/1988 | Waterworth | 123/196 R |
| 4,829,967 | 5/1989 | Nuti | 123/73 AD |
| 4,904,163 | 2/1990 | Tachi et al. | 417/53 |
| 4,967,700 | 11/1990 | Torigai | 123/73 AD |
| 4,989,555 | 2/1991 | Matsuo et al. | 123/73 AD |

FOREIGN PATENT DOCUMENTS

| | | |
|---|---|---|
| 0275715 | 7/1988 | European Pat. Off. . |
| 3025002 | 2/1981 | Fed. Rep. of Germany ........ 123/73 AD |
| 62-131908 | 6/1987 | Japan . |
| 1-044711 | 2/1989 | Japan . |
| 192505 | 4/1989 | Japan . |
| 2-191807 | 7/1990 | Japan . |
| 2-118110 | 9/1990 | Japan . |
| 2-118111 | 9/1990 | Japan . |
| 2-139307 | 11/1990 | Japan . |

OTHER PUBLICATIONS

European Search Report EP 92 10 6361, dated Jun. 19, 1992.
Patent Abstract of Japan, vol. 12, No. 121, Apr. 15, 1988 & JP-A-62 248 812 Oct. 19, 1987.

*Primary Examiner*—E. Rollins Cross
*Assistant Examiner*—Erick Solis
*Attorney, Agent, or Firm*—Knobbe, Martens, Olson & Bear

[57] ABSTRACT

A lubricating oil supplying system for a two cycle engine that includes a reciprocating engine drive lubricant pump and a solenoid controlled bypass valve for selectively delivering lubricant to the engine of by bypassing it back to the inlet side of the lubricant pump to control the amount of lubricant supplied to the engine. The duty cycle of solenoid is increased as the engine speed is decreased and the duty cycle is also decreased when the throttle is opened rapidly so as to insure the proper amount of lubricant flow to the engine under all conditions, both transient and steady state.

23 Claims, 2 Drawing Sheets

1

LUBRICATING OIL SUPPLYING SYSTEM FOR TWO CYCLE ENGINE

BACKGROUND OF THE INVENTION

This invention relates to a lubricating oil supplying system for a two cycle engine and more particularly to an improved apparatus and method for controlling the supply of lubricant to a two cycle engine.

The advantages of two cycle internal combustion engines in so far as simplicity and high output for a given displacement are well known. Conventionally it has been the practice to lubricate two cycle engines by mixing lubricant with the fuel consumed by the engine. However, this method of lubrication, although simple and low in cost, does not provide adequate control for the amount of lubricant consumed. That is, when fuel and lubricant are mixed, it is necessary to insure that the mixture will satisfy the most severe operating condition. As a result, excess lubricant is supplied under most operating conditions.

To avoid these problems and to insure better lubrication, lubricant control and reduction of lubricant consumption, it has been proposed to employ a separate lubricating system for two cycle engines. Such separate lubricating systems employ a pump that pumps lubricant to the engine for its lubrication. This lubricant may be delivered to the induction system for the engine, directly to components to be lubricated or a combination of the above.

Normally a form of reciprocating type of pump is employed which is driven by the engine for supplying the lubricant. Such pumps have the advantage of providing accurate control of the amount of lubricant delivered and are capable of delivering relatively small amounts of lubricant. However, the amount of lubricant delivered by such a pump is related directly to engine speed and the lubricant requirements of the engine are not necessarily so related.

One way in which the amount of lubricant pumped has been controlled is by controlling the effective stroke of the lubricant pump either by changing the stroke or by use of a spill type valve which in effect changes the stroke pump. FIG. 1 is a graphical view showing the way in which lubricant is controlled with conventional systems and the actual lubricant requirements for the engine. This figure is a graphical view showing the relationship of engine speed to lubricant amount. Normally, the amount of lubricant supplied to the engine is controlled along a curve as shown by the curve "a" wherein the output of the lubricating pump is varied dependent upon accelerator or throttle valve position. It will be seen that the amount of lubricant supplied is increased along a slope from a given engine speed up until a maximum amount and then is held constant.

The dotted line curve "b" shows the actual lubricant requirements for the engine. As may be seen, the approximation curve using throttle valve or accelerator position can relatively closely match engine lubricating requirements under a wide range of steady state conditions.

However, because the lubricant control is varied in response to throttle valve position and throttle valve position changes more rapidly than engine speed, this type of control can produce excess lubricant under transient conditions. This is depicted by the dot/dash line curve "c" in FIG. 1 which shows the effect of the operator suddenly opening the throttle valve. When this occurs, the lubricant amount is rapidly increased even though the engine speed has not increased in the same proportion.

In addition to the aforenoted defects, the use of mechanisms to change the stroke of the pump or spill valves require relatively expensive pumps and can be subject to mechanical failure.

It is, therefore, a principal object of this invention to provide an improved lubricating oil supply system for a two cycle engine.

It is a further object of this invention to provide a lubricating oil supply system for a two cycle engine wherein the amount of lubricant supplied to the engine can be closely tailored to the actual running condition, even under transient conditions.

SUMMARY OF THE INVENTION

A first feature of this invention is adapted to be embodied in a lubricating system for an internal combustion engine that comprises a lubricant pump that is driven in timed relationship to the engine and which delivers a substantially fixed amount of lubricant during each cycle of its operation. Conduit means extend from the lubricant pump to the engine for delivering the lubricant thereto. Valve means are provided in the conduit means for selectively controlling the flow of lubricant to the engine. To do this, the valve means has a flow position in which lubricant flow to the engine is permitted and a non-flow position in which lubricant flow to the engine is precluded. In accordance with this feature of the invention, means are provided for operating the valve means for varying the time period when the valve means is in its flow position and the time period when the valve means is in its non-flow position for controlling the amount of lubricant delivered to the engine.

Another feature of the invention is adapted to be embodied in a method for operating a lubricating system for an internal combustion engine that comprises a lubricant pump that is driven in timed relationship to the engine and which delivers a substantially fixed amount of lubricant during each cycle of its operation. A valve is provided in the outlet side of the lubricant pump for selectively delivering lubricant to the engine for its lubrication or for diverting the flow of lubricant from the engine. In accordance with this feature of the invention, the valve is controlled to vary the time period when lubricant is delivered to the engine in relation to the time period when lubricant is not delivered to the engine for controlling the amount of lubricant supplied to the engine.

DETAILED DESCRIPTION OF THE PREFERRED EMBODIMENTS OF THE INVENTION

Figure 1:
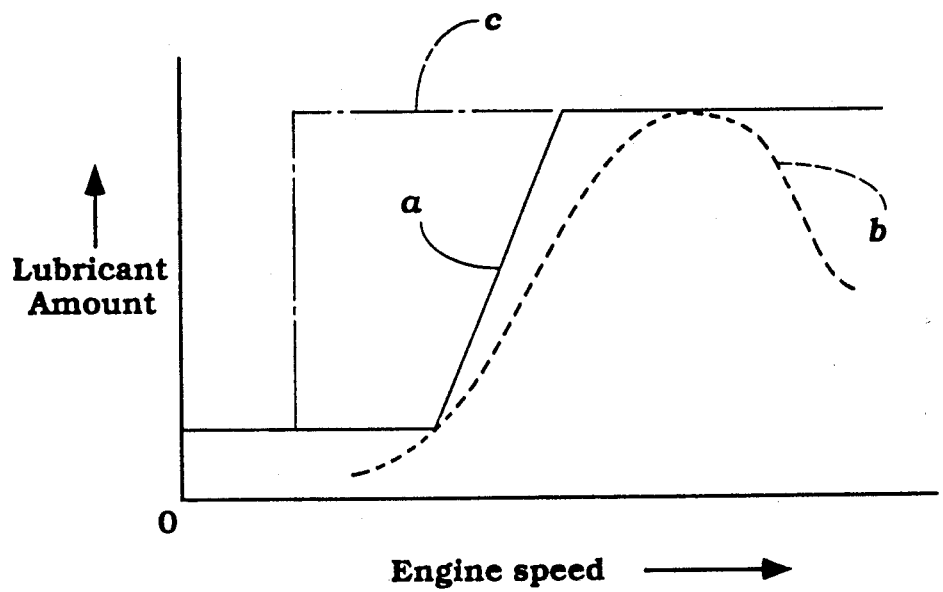
FIG. 1 is a graphical view showing the lubricant delivery characteristics and lubricant requirements in conjunction with prior art type of systems.

Referring first in detail to FIG. 1, a lubricating system constructed in accordance with an embodiment of the invention is identified generally by the reference numeral 11. The lubricating system 11 is designed to supply lubricant, in a manner to be described, to an internal combustion engine, indicated generally by the reference numeral 12 and which engine operates on a two cycle principal. Since the particular construction of the engine 12 itself forms no part of the invention, the engine 12 has been shown in block form.

The lubricant supplied to the engine by the system 11 may be supplied either to the induction system of the engine 12, to the various components of the engine to be directly lubricated, or a combination of these systems. Since the particular manner in which the lubricant is delivered to the various internal components of the engine 12 is not a critical feature of the invention, it is to be understood that any of the known types of prior art lubricant delivery systems internally of the engine may be employed.

Figure 3:
FIG. 3 is a graphical view showing the output of the lubricant pump in relation to time when the engine is running at a slow speed.
Figure 5:
FIG. 5 is a graphical view showing the lubricant delivery from the lubricant pump when running at high speed.

The lubricating system 11 includes a lubricant tank 13 in which a quantity of lubricant is contained. A conduit 14 supplies lubricant from the tank 13 to a reciprocating type of lubricant pump, indicated generally by the reference numeral 15 and which is driven by the engine 12. A conventional plunger type pump may be employed and as shown in FIGS. 3 and 5, the output of the pump will be substantially the same for each pumping cycle. However, as the engine speed increases, the number of pumping pulses generated during a given time period will increase. As a result, the output of lubricant pump 15 will increase as engine speed increases. FIG. 3 shows the pump delivery at low speeds while FIG. 5 shows the pump delivery at high speeds.

Figure 2:
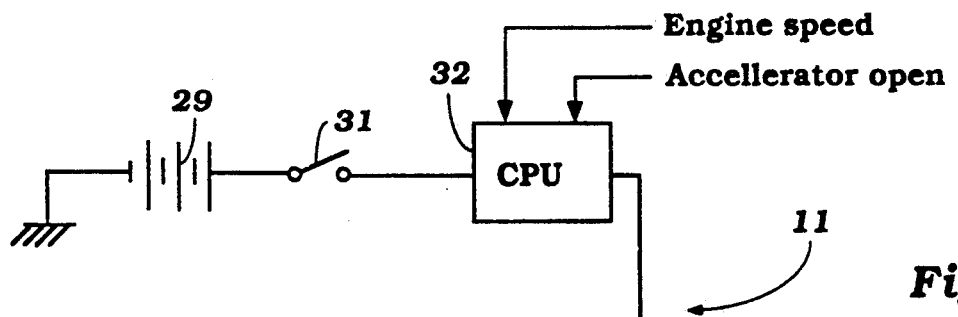
FIG. 2 is a partially schematic view of the lubricating system constructed in accordance with an embodiment of the invention, with the lubricant control valve being shown in cross-section.
Figure 2:
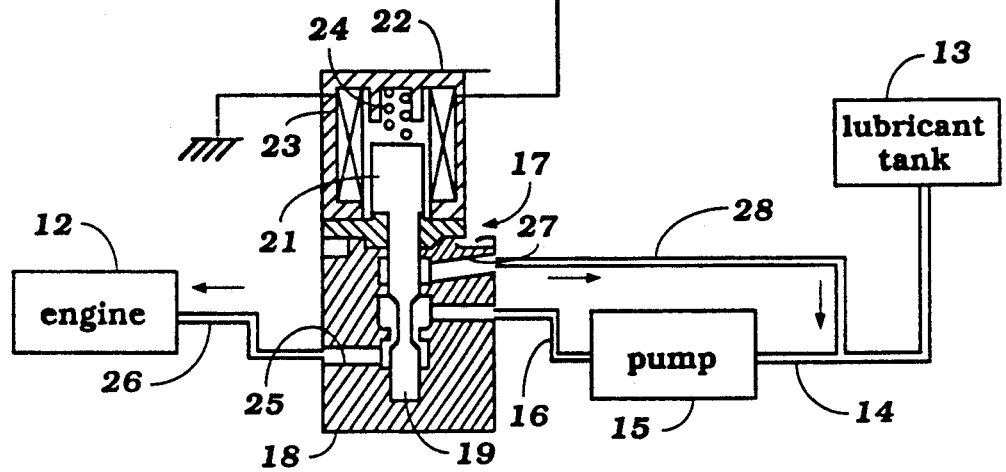

A supply conduit 16 extends from the pump 15 to a control valve assembly, indicated generally by the reference numeral 17 and which is operated in accordance with the invention. The valve assembly 17 includes a body assembly 18 having an internal bore in which a spool type valve 19 is provided. The spool type valve 19 has an armature 21 which forms a portion of an solenoid assembly, indicated generally by the reference numeral 22 and which includes an encircling solenoid coil 23. A coil compression spring 24 normally urges the spool type valve 19 to a first position as shown in FIG. 2 wherein the spool 19 is in a position to open communication with a port 25 that communicates the pump output conduit 16 with a supply conduit 26 that delivers the lubricant to the engine lubricating system.

When the solenoid 22 is energized to energize the winding 23, the armature 21 and spool valve 19 will be drawn upwardly to compress the spring 24 and communicate the pump conduit 16 with a return port 27 that delivers lubricant back to the conduit 14 through a return conduit 28. As a result, when the valve is in this return condition, the output pressure from the pump 15 will be returned back to its supply side and no lubricant will be delivered to the engine 12 through the conduit 26.

The solenoid winding 23 is energized by means of an electrical circuit that includes a battery 29 and main switch 31. These power a CPU 32 which is preprogrammed to supply the desired pulses to the solenoid 23 depending upon sensed engine conditions. These conditions may include engine speed which is supplied from a suitable engine speed sensor and accelerator position that is sensed by an appropriate throttle position sensor. In addition, other conditions both of engine operation and of ambient conditions may be supplied to the CPU 32.

Figure 4:
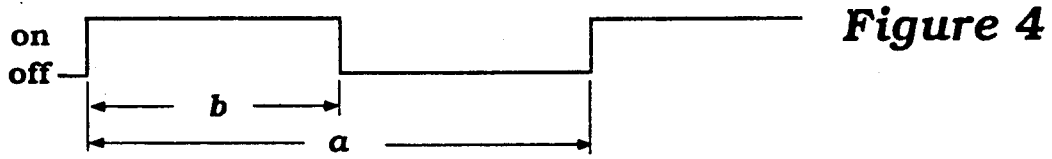
FIG. 4 is a graphical view showing the control pulses delivered to the control valve for controlling the amount of lubricant flow under this running condition.
Figure 6:
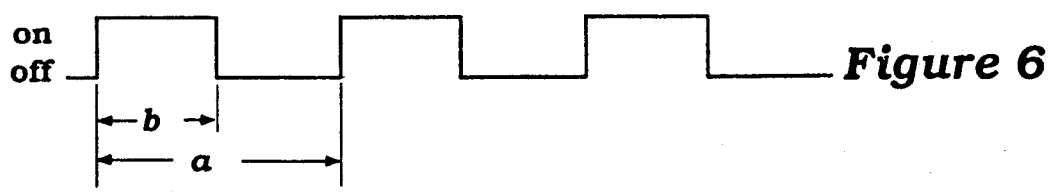
FIG. 6 is a graphical view showing the control pulses to control the amount of lubricant under this condition.

As may be seen in FIGS. 4 and 6, when the CPU 32 outputs an energizing signal for a time period "b", the valve 19 will be in its return or bypass position and no lubricant will be delivered to the engine. During the remainder of an overall time period "a" the solenoid coil 23 will not be energized and lubricant will be delivered for a time period (a - b). Hence, the amount of lubricant delivered during a given time period will be determined by the duty ratio $$\frac{a-b}{a} \times 100\%.$$

It should also be noted that, because the pump 15 is driven at a fixed ratio of speed relative to the speed of the engine 12, a shorter time interval of de-energization of the winding 23 will provide a greater amount of lubricant flow than the same time period when the engine is operating at a higher speed. Thus, the time interval of the duty cycle must be adjusted in relation to engine speed and it is designed so that, as seen in FIG. 4, when the engine is operating at a slow speed the duty cycle is longer than when operating at a high speed. The ratios of duty cycles will be determined by the actual requirements of the engine and this can then be programmed into the CPU so as to provide the appropriate amount of lubrication under all speeds. This will insure against excess oil consumption and also against smoke in the exhaust.

As noted previously, however, merely controlling the duty cycle in relation to engine speed alone will provide adequate control under steady state conditions but does not accommodate transient conditions. Therefore, in accordance with a feature of the invention, the CPU also senses when the accelerator is opened at a rapid rate and when this occurs, the duty cycle is shortened for a given engine speed condition so as to insure that excess lubricant is not supplied to the engine and also that the amount of lubricants supplied will be appropriate for the actual running conditions.

Of course, the described control routine will be dependent upon the actual requirements of a given engine but it should be readily apparent that with the described system it is possible to provide good control of the amount of lubricant by varying both the length of time when lubricant is supplied and the duty ratio. That is, the amount of lubricant is controlled by the changing the ratio of $$\frac{a-b}{a}$$

as well as by varying "a" and "b".

It is also to be understood that the described construction is only a specific preferred embodiment of the invention and that various changes and modifications may be made without departing from the spirit and scope of the invention, as defined by the appended claims.

I claim:

1. A lubricating system for an internal combustion engine comprising a reciprocating lubricant pump driven by said engine at a fixed speed ratio, said lubricant pump delivering a substantially fixed amount of lubricant during each cycle of its operation, conduit means extending from said lubricant pump to said engine for delivering lubricant thereto, valve means in said conduit means for selectively controlling the flow of lubricant to said engine, said valve means having a flow position in which lubricant flow to said engine is permitted and a non-flow position in which lubricant flow to said engine is precluded, successive flow and non-flow positions comprising a duty cycle "a" with the time of delivery of lubricant during a duty cycle being defined as a time period (a-b) where the time "b" is the time of non-delivery, and means for operating said valve means for varying the time period when said valve means is in its flow position (a-b) and in its non-flow position (b) and also the duty cycle for controlling the amount of lubricant delivered to said engine.

2. A lubricating system as set forth in claim 1 wherein the means for operating the valve means is responsive to an engine condition.

3. A lubricating system as set forth in claim 2 wherein the engine condition is speed.

4. A lubricating system as set forth in claim 2 wherein the engine condition is throttle position.

5. A lubricating system as set forth in claim 4 wherein the engine condition is also speed.

6. A lubricating system as set forth in claim 1 wherein the duty cycle is shortened in response to an engine condition.

7. A lubricating system as set forth in claim 6 wherein the engine condition is speed and the duty cycle is shortened as speed is increased.

8. A lubricating system as set forth in claim 7 wherein the time during which the valve means is maintained in its flow position is increased as the engine speed is decreased.

9. A lubricating system as set forth in claim 6 wherein the engine condition is throttle position.

10. A lubricating system as set forth in claim 9 wherein the time when the valve means is in its flow position is decreased in response to a rapid increase in the opening of the throttle.

11. A lubricating system as set forth in claim 9 wherein time when the valve is in its flow position is also varied in response to engine speed.

12. A lubricating system as set forth in claim 11 wherein the time during which the valve means is maintained in its flow position is increased as the engine speed is decreased.

13. A lubricating system as set forth in claim 1 wherein the valve means in its non-flow position returns lubricant to an inlet side of the lubricant pump.

14. A lubricating system as set forth in claim 13 wherein the valve means is electrically controlled.

15. A method of lubricating an internal combustion engine comprising a reciprocating lubricant pump driven at a fixed ratio by the engine, the lubricant pump delivering a substantially fixed amount of lubricant during each cycle of its operation, valve means for selectively controlling the flow of lubricant to the engine, the valve means having a flow position in which lubricant flow to the engine is permitted and a non-flow position in which lubricant flow to said engine is precluded, successive flow and non-flow positions comprising a duty cycle "a" with the time of delivery of lubricant during a duty cycle being defined as a time period (a-b) where the time "b" is the time of non-delivery, the method comprises the steps of operating the valve means for varying the time period when the valve means is in its flow position (a-b) and in its non-flow position (b) and also the duty cycle for controlling the amount of lubricant delivered to the engine.

16. A method of lubricating as set forth in claim 15 wherein the operation of the valve means is done in response to an engine condition.

17. A method of lubricating as set forth in claim 16 wherein the engine condition is speed.

18. A method of lubricating as set forth in claim 16 wherein the engine condition is throttle position.

19. A method of lubricating as set forth in claim 18 wherein the engine condition is also speed.

20. A method of lubricating as set forth in claim 17 wherein the time during which the valve means is maintained in its flow position is increased as the engine speed is decreased.

21. A method of lubricating as set forth in claim 18 wherein the time when the valve means is in its flow position is decreased in response to a rapid increase in the opening of the throttle.

22. A method of lubricating as set forth in claim 21 wherein the engine condition is also speed.

23. A method of lubricating as set fort in claim 22 wherein the time during which the valve means is maintained in its flow position is increased as the engine speed is decreased.

* * * * *